No. 822,547. PATENTED JUNE 5, 1906.
G. W. NICOLSON.
EXCAVATOR.
APPLICATION FILED MAY 27, 1905.
2 SHEETS—SHEET 2.
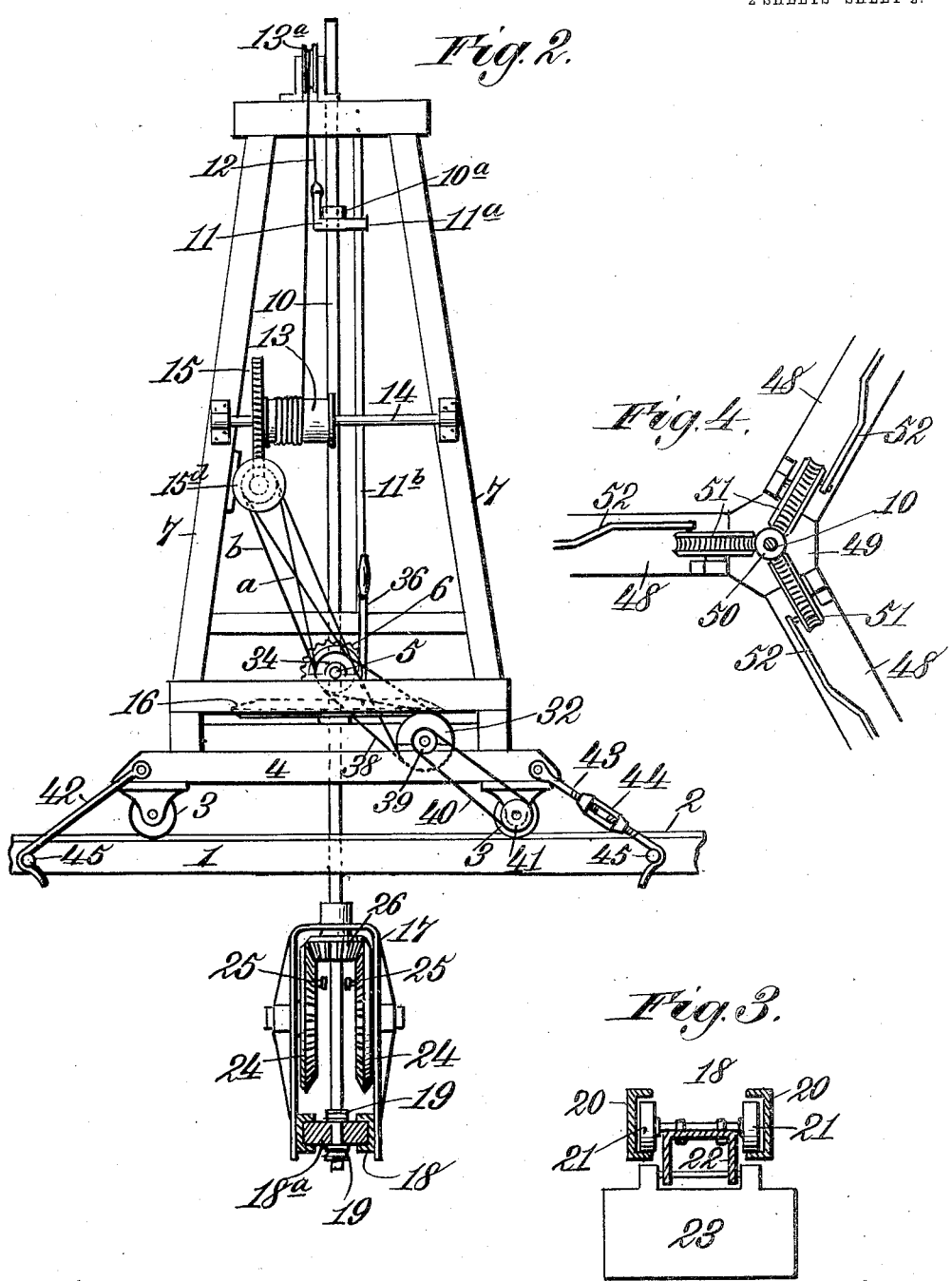
Witnesses,
Robert Everitt,
Inventor:
George W. Nicolson,
By James L. Norris.
Atty.

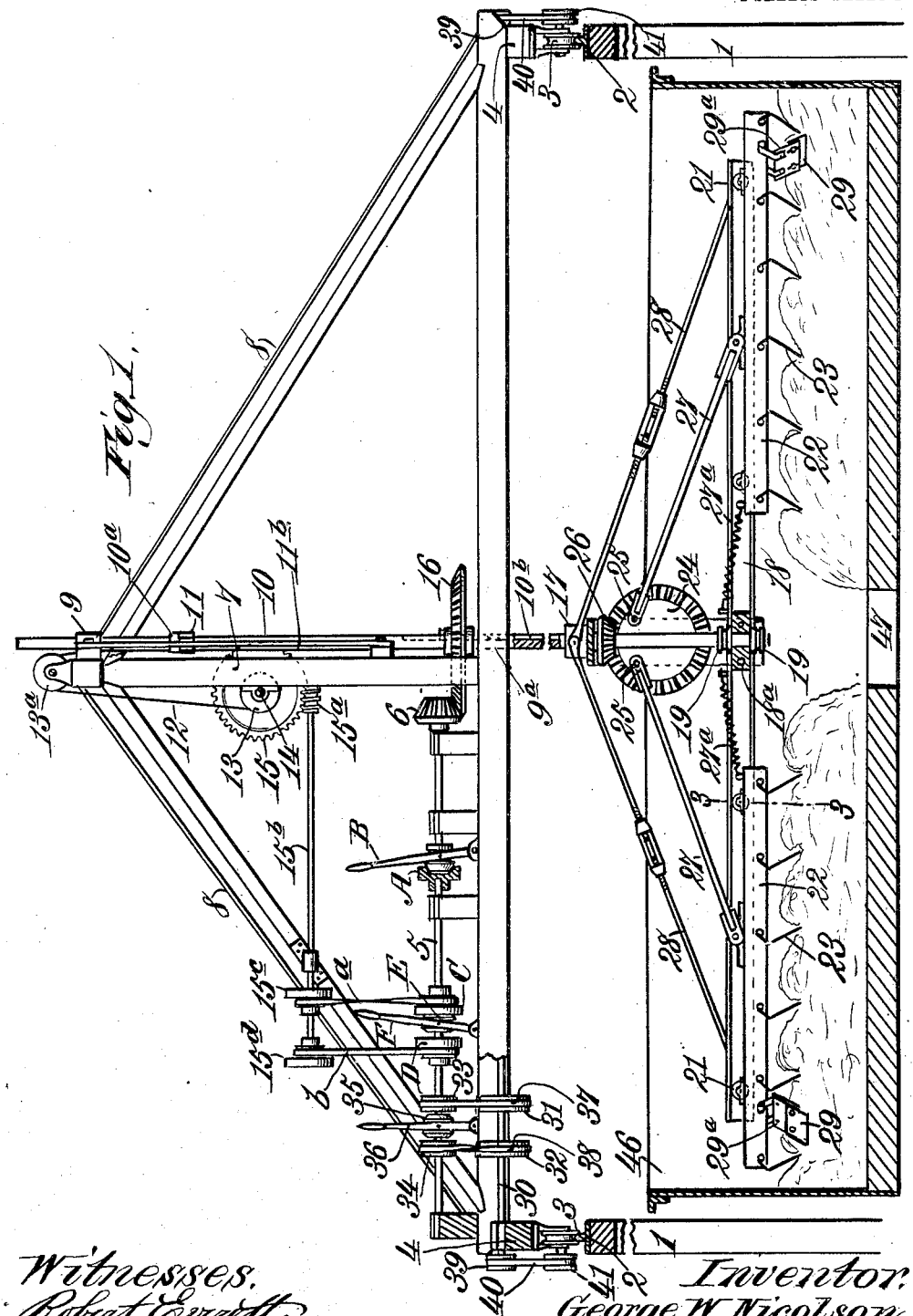

UNITED STATES PATENT OFFICE.

GEORGE W. NICOLSON, OF MOJAVE, CALIFORNIA.

EXCAVATOR.

No. 822,547.  Specification of Letters Patent.  Patented June 5, 1906.

Application filed May 27, 1905. Serial No. 262,653.

*To all whom it may concern:*

Be it known that I, GEORGE W. NICOLSON, a citizen of the United States, residing at Mojave, in the county of Kern and State of California, have invented new and useful Improvements in Excavators, of which the following is a specification.

This invention relates to an excavator of that class adapted to loosen up, collect, or remove sediment or deposit in the bottoms of tanks or to coöperate with any other surface. The present excavator operates to loosen and draw the sediment or deposit toward the center of the surface treated, and when employed over tanks the centrally-disposed collected material may be released either through a bottom discharge or elevated and removed at the top.

The apparatus embodying the features of the invention consists of a movable bridge or support having means to travel on tracks, to span tanks or other surfaces, and supporting the excavating or loosening mechanism through the medium of a main vertical shaft, which is readily elevatable and depressible and having the function to actuate scraping or dragging devices rectilinearly operating inwardly and outwardly in alternation and automatically shiftable in limited arcs to change the points of application of the several scraping or dragging devices.

In the simplified form of the invention the excavator mechanism consists of arms supported by a vertical shaft and unitedly forming one or more beams having reciprocating scrapers disposed thereon. The scrapers or blades are hung on slides or frames engaging the arms and loosely move over the material to be excavated or centrally collected during the outward strokes of the slides or frames and firmly take into and draw inwardly the said material on the inward strokes of the slides or frames. Carried by the outer extremities of the slides or frames are obliquely-disposed deflectors which operate when the slides or frames are moving outwardly to shift the latter and the beam or arms carrying the same in curved paths over the sediment or deposit. This automatic movement of the slides or frames carrying the scrapers or blades is an important feature of the excavator in view of the fact that the mechanism is materially reduced and close attention by an operator to arrive at this result is not required.

The invention also consists in the details of construction and arrangement of the several parts, which will be more fully hereinafter set forth.

In the drawings, Figure 1 is a side elevation of an excavator embodying the features of the invention and shown broken away or in section at different points and as applied over a tank also illustrated in section. Fig. 2 is an end elevation of the excavator, partially broken away and showing some of the parts disconnected therefrom. Fig. 3 is a transverse vertical section on the line 3 3, Fig. 1. Fig. 4 is a detail plan view of portions of the plurality of arms, showing a modification of the parts of the mechanism, the main vertical shaft in this instance being shown in horizontal section.

Similar characters of reference indicate corresponding parts of the several features.

The numeral 1 designates a track-support similarly arranged in duplicate on opposite sides of the surface to be treated or of a tank, as shown, and may be of such length as to render the excavating mechanism entirely convenient for use with a number of tanks which may be disposed in alinement. On each support 1 a suitable rail 2 is secured and engaged by rollers 3, held at the opposite ends of a bridge 4 of suitable structure and which may in some instances also have a motor disposed thereon or connections for any other suitable driving means for a sectional power-transmitting shaft 5, mounted in suitable bearings on the bridge and having a bevel-pinion 6 at its inner end. Centrally rising from the bridge 4 is a frame 7, to the upper portion of which and the opposite ends of the bridge 4 braces 8 are attached to insure stability of the structure as an entirety to prevent movement of the frame or displacement thereof under strain. The frame 7 may be of any contour and, as shown, is approximately triangular and has on the upper portion thereof a combined bearing and guide 9, which vertically alines with a suitable opening $9^a$ in the central portion of the bridge 4 for a vertically-movable shaft 10, formed with a longitudinal groove $10^b$ and also extending through a vertically-movable gripping or clamping device 11, having a cord, cable, chain, or analogous device 12, attached thereto and movable over a sheave or pulley $13^a$ on the top of the frame and connected to a drum 13, carried by and rotatable with a cross-shaft 14, having a worm-wheel 15 thereon. The cord, cable, or analogous device 12 is wound on or unwound from the drum 13 to elevate or lower the shaft 10.

On the shaft 10 is a stop $10^a$, against which the gripping or clamping device 11 is adapted to have bearing, the said gripping or clamping device being provided with a sliding extension $11^a$, engaging a guide rod or bar $11^b$, suitably held by the frame. The guide-rod $11^b$ maintains the gripping or clamping device in one position and facilitates the elevation of the shaft 10 without imparting to the latter undue strain in view of the weight of the mechanism held on the lower extremity thereof. The shaft 10 is rotatable in the bearing 9, opening $9^a$, and the gripping or clamping device 11 and is also slidable through a bevel-gear 16, horizontally disposed on the central portion of the bridge at the base of the frame 7, the said gear having a feather or other analogous device to engage the groove $10^b$ of the shaft 10 to insure a positive rotation of the latter. The gear 16 is held in continual mesh with the pinion 6 on the shaft 5, and the speed of rotation of the shaft 10 may be readily controlled by the motive means operating the shaft 5, and at times when it is desired to have the shaft 10 remain inactive the portion of the shaft on which the pinion 6 is directly secured is disengaged from the remaining portion of the shaft 5 by suitable clutch mechanism A, having an operating-lever B. At any time desired the pinion 6 may be set in motion or its rotation caused to cease by changing the position of the coöperating parts of the clutch mechanism A, as will be readily understood.

The worm-wheel 15 meshes with a worm $15^a$ on a worm-shaft $15^b$, provided with differential or cone pulleys $15^c$ and $15^d$ on its outer extremity and respectively operated from the power-transmitting shaft 5 by cross-belt $a$ and a straight belt $b$ to impart reverse movement to the said shaft $15^b$ to raise and lower the shaft 10. The cross-belt $a$ and straight belt $b$ respectively engage differential or cone pulleys C and D, normally loose on the shaft 5 and thrown into engagement with the latter through the medium of a clutch mechanism E, having an operating-lever F.

The shaft 10 depends below the bridge 4 and extends through a central yoke 17 and also through the intermediate portion of a beam 18, on which the yoke is supported, the said beam being composed of two oppositely-disposed channel-iron members 20, having their open sides inwardly disposed and connected at suitable points to preserve the same in parallel relation, as indicated by Figs. 2 and 3. The beam and yoke are included in the organization with direct-acting excavating mechanism, the lower end of the shaft 10 being held by collars 19, arranged above and below and adjacent to an intermediate central connecting-block or cross-piece $18^a$ for the members 20 of the beam to thus attach the latter to the shaft and to each other; but said shaft has free rotation in the block or cross-piece, as well as in the upper or central top portion of the yoke 17. The members 20 of the beam have antifrictional rollers 21 movably fitted therein and connected to the upper portions of slides or frames 22, preferably of inverted approximately U-shaped channel-iron and located between said members 20. These slides or frames 22 are moved simultaneously inwardly and outwardly over the beam and have a series of suitably-shaped blades or scrapers 23, pivotally attached thereto and depending therefrom, and so proportioned and disposed that when the slides or frames move outwardly they will loosely slip over the material to be excavated, and on the inward strokes of the slides or frames the said scrapers or blades are forced and held rigidly against their slides and caused to penetrate or dig into and drag the deposit or sediment inwardly. The mechanism for actuating the slides or frames in one form and as shown by Figs. 1 and 2 is held by the yoke 17 and consists of a pair of oppositely-disposed beveled crank-gears 24, having crank-pins 25, one on each, the said pins being similarly positioned. The crank-gears 24 are held in continual mesh with a bevel-pinion 26, fast on the shaft 10, and by this means a similar speed of rotation will be imparted to the crank-gears. Between the crank-gears connecting-rods 27 are interposed and are attached by suitable strap connections, as in ordinary devices of this class, to the top portions of the slides or frames 22 and also to the crank-pins 25. To the opposite ends of the connecting-block or cross-piece $18^a$ or to the base of the yoke 17 the inner ends of springs $27^a$ are attached, said springs having their outer ends secured to the slides or frames 22, and operate to equalize the strokes of the latter and facilitate the inward movement of the same. As a reinforcing means for the beam 18 adjustable braces 28 are attached thereto and to the upper and top portion of the yoke 17, and by the use of these braces misshaping of the outer extremities of the beam by the strain imposed thereon by the length required is avoided, and at the same time the lower structure or the direct-acting excavating mechanism is preserved in comparatively light form.

The outer ends of the frames or slides 22 are provided with automatically-operating deflectors for regularly changing the position of the beam and the blades or scrapers held by the frame with respect to the deposit of sediment. These deflectors consist of blades 29 and supports $29^a$, which are disposed at an oblique angle reversely to the position of the blades or scrapers 23 and are also movably attached, so that when slides or frames 22 are drawn inwardly the deflectors will slip over the material to be excavated; but on the back stroke or outward movement of the frame or slides when the scrapers or blades 23 are loosely moving over the sediment or deposit the deflectors will become rigid and by their angular disposition turn or shift the beam 18 and the frames or slides 22, carried thereby, a limited arcuate distance to regularly bring the scrapers or blades 23 over a different part of the deposit or sediment to be excavated. This automatic shifting of the beam 18 and the frames or slides 22 is regularly effected throughout the entire operation of the mechanism with respect to the deposit or accumulation of sediment to be loosened and removed. The blades 29 of the deflectors are adjustable on the supports 29$^a$, as shown, to adapt the deflectors for operation on different materials by regulating the depth of penetration of the blades 29.

On the bridge is disposed a shaft 30, extending completely across the bridge and suitably supported, and thereon are fixed two pulleys 31 and 32, in alinement with pulleys 33 and 34, on the shaft 5, the latter having between the said pulleys 33 and 34 a clutch element 35, controlled by a lever 36. The pulleys 33 and 34 are loose on the shaft 5, and the clutch element 35 is splined to said shaft and is movable through the medium of the lever 36 to throw either one of the pulleys 33 or 34 into operative relation to said shaft 5. Between the pulleys 31 and 33 and engaging the latter is a straight belt 37, and trained over the belts 32 and 34 is a cross-belt 38 for reversing the movement of the shaft 30. On the opposite ends of the said shaft 30 are suitable belt-wheels 39, surrounded by belts 40, which are also trained over belt-wheels 41 on the axles of a part of the grooved track-wheels 3. Through the medium of the shaft 30 with its pulleys and the belt-wheels 39, belts 40, and belt-wheels 41 the entire excavating mechanism may be moved forwardly and backwardly on the track-rails 2 to any point desired with respect to the material to be excavated or cleared entirely from one tank-inclosure and arranged in operative relation to another similar inclosure or other surface to be treated. The belt-wheels 39 and 41 and belts 40 may be of any preferred form and either of sprocket or chain construction or smooth wheels engaged by band-belts. To hold the frame and the excavator steady while the excavating devices are operating on the material or sediment to be removed, the ends of the frame have hooks 42 pivoted adjacent to one side and adjustable hooks 43 adjacent to the opposite side, the hooks 43 having intermediate turnbuckles 44, and both hooks 42 and 43 are adapted to be caught over studs or projections 45, arranged at intervals on the track-supporting structure.

The improved mechanism is shown applied to a tank 46, having a central opening 47, toward which the sediment or deposit on the bottom of the tank is regularly drawn and discharged.

In the form of the mechanism shown by Figs. 1 and 2 the beam 18 comprises two oppositely-extending members or arms, which under ordinary operations will be sufficient; but at times it may be desirable to use a greater number of arms, and in the modification illustrated by Fig. 4 a series of three arms 48 are shown and radiating from a common center 49, through which the shaft 10 extends and is provided with a worm 50, held in continual mesh with worm-wheels 51, individually supported by the arms 48 and having connecting-rods 52 attached thereto. The connecting-rods 52 will be extended out and secured to the frames similar to those heretofore described. By increasing the number of arms and correspondingly employing the scrapers or blades the working area of the directly-operating excavating mechanism will be materially increased. Through the medium of the clutch device or mechanism E, coöperating with the shaft 5 and the pulleys C and D, which are respectively connected to the pulleys 15$^c$ and 15$^d$ by cross-belt $a$ and straight belt $b$, the shaft 10 may be raised or lowered through the reverse operation of the worm-shaft 15$^b$ and the worm 15$^a$, meshing with the worm 15 on the shaft 14; and such elevation and depression of the shaft 10 may be effected during the rotation thereof by suitably disposing the clutch mechanism A, or this elevation and depression of the shaft 10 can be pursued during inactivity of the scrapers or blades and the mechanism coöperating therewith by causing the rotation of the shaft 10 to cease, and which can be accomplished by throwing the portion of the shaft 5 carrying the pinion 6 out of operative relation with the remaining part of said shaft.

As will be readily understood, the operation of the excavator is not limited to any precise application, and it can be equally well used on an open surface and in some instances where it is used with tanks that do not have central discharge-openings the sediment collected at the center may be elevated and removed from the top of the tank. The blades or scrapers 23 may be either angular or curved, and obvious modifications in other details of construction will also be adopted at will.

A material advantage of the improved form of excavator is that after it has been positioned or properly set with respect to material to be excavated or removed it has automatic operation, the excavating devices or blades 23 needing no attention so long as the material to be excavated is within reaching distance thereof.

Having thus fully described the invention, what is claimed as new is—

1. In an excavating-machine, simultaneously-reciprocating frames rectilinearly operating inwardly toward and outwardly from each other and having a plurality of scrapers depending from the lower portions thereof and movably attached thereto, and means for operating said frames.

2. In an excavating-machine, movable supporting means, simultaneously-reciprocating frames held by the said means and rectilinearly operating inwardly toward and outwardly from each other, scrapers depending from the said frames and freely movable when the latter reciprocate in one direction and held against movement when said frames move in the opposite direction, and mechanism for operating the frames and the supporting means.

3. In an excavator, a rotary supporting means, frames longitudinally reciprocating on the said means to and from each other, scrapers movably depending from the said frames, and mechanism for simultaneously operating the frames.

4. An excavating-machine having simultaneously-reciprocating frames rectilinearly movable inwardly toward and outwardly from each other and carrying scrapers which are loose in the outward movement of the frame and held rigid when the latter operate inwardly to draw material engaged toward the center of the machine, and mechanism for operating the said frames.

5. An excavator having rectilinearly-slidable automatically-rotating frames carrying depending scrapers, and means for elevating and depressing the said frames.

6. In an excavating-machine, a traveling bridge, a vertically-movable shaft held by the said bridge, and simultaneously-reciprocating frames supported by the lower extremity of the shaft and rectilinearly slidable inwardly toward and outwardly from each other and provided with depending movably-connected scrapers.

7. In an excavator, the combination of a vertically-slidable shaft, a beam connected to said shaft, frames longitudinally slidable on the beam and having depending movably-connected scrapers, and mechanism for rotating the shaft and operating the frames.

8. In an excavator, the combination of a shaft, a beam capable of rotation on the shaft, frames longitudinally slidable on the beam and having depending scrapers movably connected thereto, and deflectors disposed at an oblique angle at the outer extremities of the frames to automatically shift the latter and the beam in arcuate paths.

9. In an excavator, a support mounted to swing in a circle, a plurality of scrapers longitudinally slidable on the support, and means for intermittently imparting an arcuate movement to the support and scrapers.

10. In an excavator, the combination of a beam mounted to swing in a circle, frames longitudinally slidable on the beam and carrying depending movably-connected scrapers, and obliquely-disposed deflectors at the outer extremities of the frames to cause the beam and frames carrying the scrapers to move in an arcuate path on the outward or back strokes of the frames, the deflectors being in positions reverse to the scrapers.

11. In an excavator, the combination of a movable bridge, a shaft vertically adjustable through the bridge, a drum having a cord or cable engaging the same and connected to the shaft, a support capable of rotation on the lower extremity of the shaft, frames longitudinally slidable on the support and having depending movably-connected scrapers, and mechanism operated by the said shaft for actuating the frames.

12. In an excavator, the combination of a movable bridge, a shaft depending therefrom and vertically slidable therein, a beam rotatably supported on the lower extremity of the shaft and having a yoke extending upwardly therefrom, crank-gears held by the yoke, a pinion on the shaft engaging the crank-gears, frames longitudinally slidable on the beam and provided with depending movably-connected scrapers, and connecting means between the frames and the crank-gears.

13. In an excavator, the combination of traveling and vertically-movable supporting means, frames having antifrictional devices slidably engaging the supporting means, the said frames having longitudinal reciprocation inwardly and outwardly in reverse directions on the supporting means, scrapers movably depending from the frames and operating to draw the material engaged inwardly toward the center of the machine, and mechanism for actuating the said means and frames.

14. In an excavating-machine, the combination of a traveling bridge, a vertically-slidable shaft depending from said bridge and extending upwardly through the latter, a horizontally-disposed driving-shaft for operating the vertically-slidable shaft, means between the driving-shaft and vertically-slidable shaft for controlling the vertical adjustment of the latter shaft, mechanism for disconnecting the vertically-slidable shaft from the driving-shaft, and simultaneously reciprocating reversely-moving frames supported on the lower extremity of the slidable shaft below the bridge and having scrapers movably depending therefrom.

15. In an excavating-machine, the combination of a traveling bridge having wheels connected thereto, track devices with which the said wheels engage, a motion-transmitting shaft carried by the bridge, a driving-shaft on the bridge, devices carried by the driving-shaft, motion-transmitting shaft and a part of the wheels of the bridge for shifting the entire apparatus on the track devices in opposite directions, a vertically-adjustable shaft held by and depending below the bridge and in separable coöperation with respect to the driving-shaft, and simultaneously-reciprocating reversely-operating frames held on the lower extremity of the vertically-adjustable shaft and provided with depending movable scrapers.

In testimony whereof I have hereunto set my hand in presence of two subscribing witnesses.

GEORGE W. NICOLSON.

Witnesses:
SAML. KREPTAEL,
J. M. BAKER.